United States Patent [19]

Heath

[11] 4,311,339

[45] Jan. 19, 1982

[54] INFANT CARRIER

[75] Inventor: Robert B. Heath, Lonsdale, Australia

[73] Assignee: Rainsfords Metal Products Pty. Ltd., South Australia, Australia

[21] Appl. No.: 92,072

[22] Filed: Nov. 7, 1979

[30] Foreign Application Priority Data

Nov. 21, 1978 [AU] Australia .................. PD6850

[51] Int. Cl.³ .................. A47C 31/00; B60R 21/00
[52] U.S. Cl. .................. 297/487; 297/216;
297/464; 297/DIG. 1; 297/DIG. 2; 280/749
[58] Field of Search .............. 297/216, 464, 487, 488,
297/453, DIG. 1, DIG. 2; 280/749, 748; 24/9

[56] References Cited

U.S. PATENT DOCUMENTS

| 1,669,983 | 5/1928 | Humphrey | 24/9 |
| 3,137,523 | 6/1964 | Karner | 297/453 X |
| 3,169,781 | 2/1965 | Abruzzino | 297/487 X |
| 3,713,695 | 1/1973 | Von Wimmersperg | 297/487 |
| 3,770,318 | 11/1973 | Fenton | 297/453 |
| 4,025,111 | 5/1977 | Tanaka | 297/487 X |

Primary Examiner—James T. McCall
Attorney, Agent, or Firm—Norbert P. Holler; Charles A. Blank

[57] ABSTRACT

A container, for carrying an infant in a supine position, having an open top which is covered by a flexible cover of resilient perforate material, provided with seat belt retention means such that it can be retained to the rear seat of a vehicle having seat belts therein, and in the event of vehicle impact, an infant is supported over a large area of its body.

6 Claims, 3 Drawing Figures

INFANT CARRIER

This invention relates to an infant carrier which is useful for protecting an infant in a motor vehicle.

BACKGROUND OF THE INVENTION

One of the problems which is encountered is finding adequate protection for a young baby up to six months old when carried in a motor vehicle, and various proposals have been put forward for carrying a young baby under safe conditions. However, serious injury can occur in the case of vehicle impact if a young baby is held in position by a seat belt, and one of the objects of this invention is to provide an infant carrier wherein there is less hazard of serious injury to a young baby in the case of a vehicle impact.

BRIEF SUMMARY OF THE INVENTION

In this invention a container, for carrying an infant in a supine position, has an open top which is covered by a flexible cover of resilient perforate material. The container is provided with seat belt retention means such that it can be retained to the rear seat of a vehicle having seat belts therein. In the event of vehicle impact, an infant is supported over a large area of its body.

More specifically, in this invention an infant carrier comprises a wall structure defining a container for carrying an infant in a supine position, and having an open top, means on the walls enabling the container to be anchored with respect to a vehicle seat, sheet retention means on the container wall structure, and a flexible cover of resilient perforate material arranged to be retained to said container walls over said open top.

For example the perforate cover may be a sheet of rubber or other flexible elastomeric material and may be retained to retention lugs by a plurality of retention straps, so arranged that upon impact of a vehicle a baby within the container will be displaced only the distance from the container walls to the perforate sheet before deceleration occurs, and the deceleration will be applied as uniformly as possible over a much larger area of the baby's body than would be the case if restraining straps or harness were used.

Another difficulty which is encountered by parents and children is that heretofore they have required an infant carrier of one size and type to carry a baby, and of another size and type to support a small child. Further in this invention the infant carrier container comprises a seat and seat back portion and a seat frame extension, and means securing the seat frame extension to the seat and seat back portion to thereby complete the wall structure so as to form the container for containing a baby, said securing means being releasable so that the seat frame extension can be removed and the container walls can then constitute the side walls, base wall and back for a seat for an older child.

When a child reaches the age of from, say six months to three years, the child frequently expresses a wish to sit upright in a vehicle and to see out of the window. Still further in this invention, there are provided securing means on the wall structure of the infant carrier to secure the seat frame extension to the seat wall in a locality whereby the seat level is raised from the vehicle seat thereby enabling the child to be supported at a higher level than if it is strapped to the seat of a vehicle.

BRIEF DESCRIPTION OF THE DRAWINGS

An embodiment of the invention is described hereunder in some detail with reference to and is illustrated in the accompanying drawings, in which.

DETAILED DESCRIPTION OF THE PREFERRED EMBODIMENT

Figure 1:
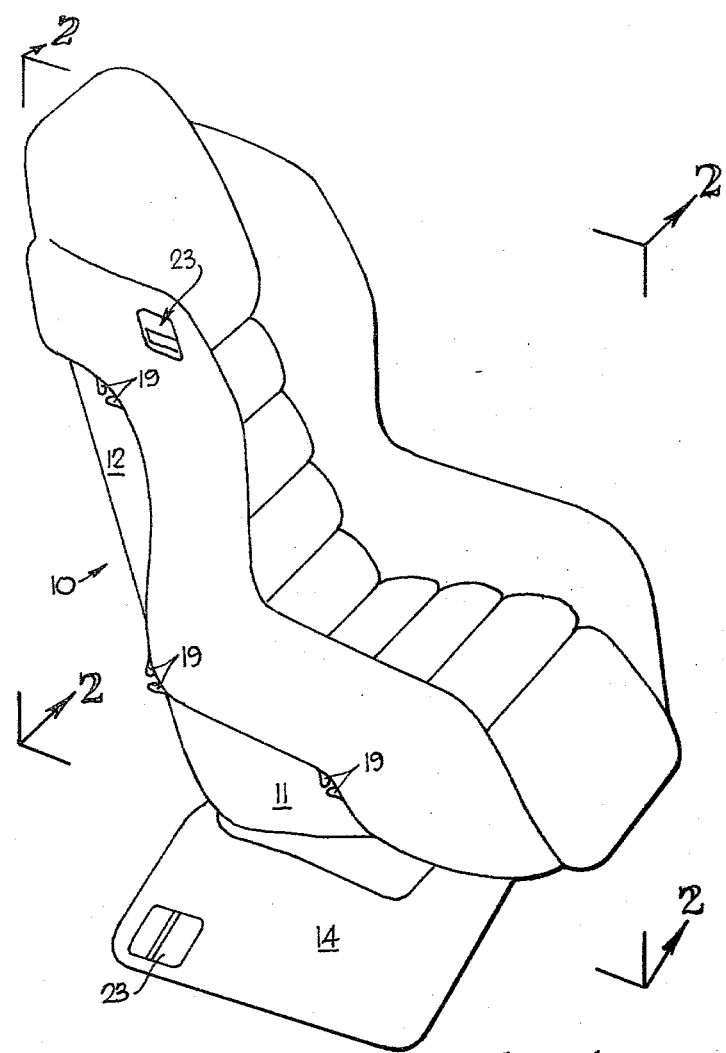
FIG. 1 is a perspective view of an infant carrier when in the seating mode.
Figure 2:
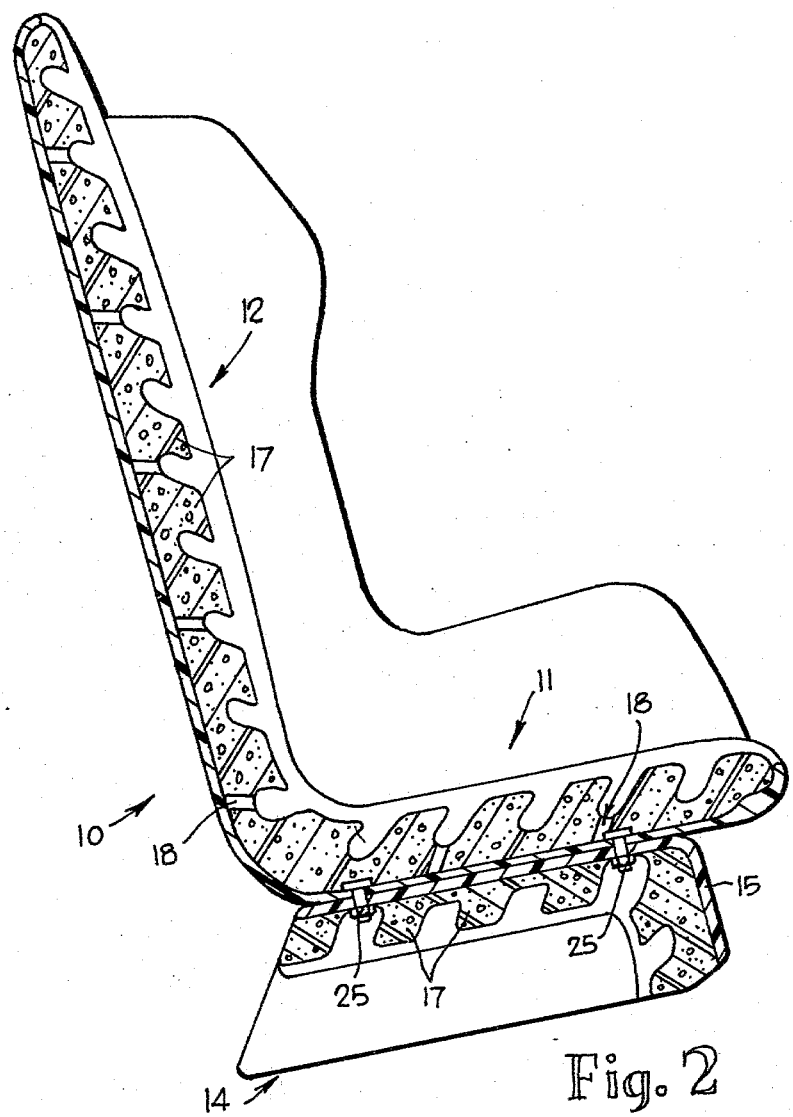
FIG. 2 is a section on plane 2-2-2 of FIG. 1.
Figure 3:
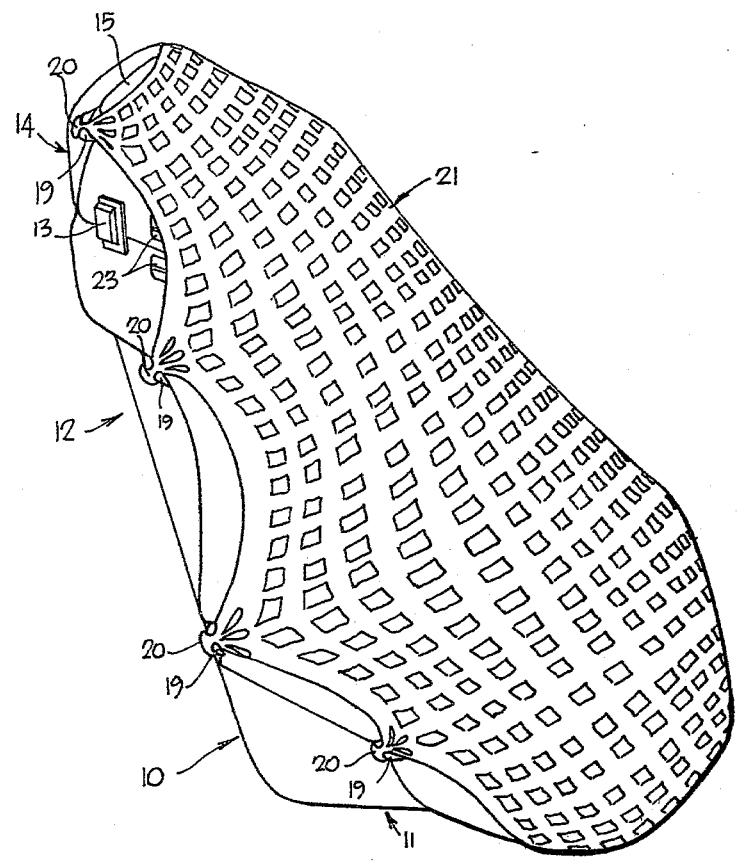
FIG. 3 is a perspective view of the infant carrier when in the supine mode.

In this embodiment FIGS. 1 and 2 illustrate the infant carrier in a seating mode, and FIG. 3 illustrates the carrier in a supine mode, that is, capable of use as a container for supporting a small body in the supine position.

In the seating mode, a seat and seat back portion 10 of an infant carrier comprise a short limb 11 and a long limb 12. An end of the long limb is provided with securing clasps 13, and a seat frame extension 14 is secured to that end by complementary securing clasp receivers. Alternatively, the securing means comprise screws and nuts, and when interengaged extend the long limb of the seat frame. The extension 14 has an upstanding end wall 15 and converts the carrier into an open top container-like structure for use in a bassinet type supine mode. The container walls are all lined with (or formed integrally with) ribs 17 and apertures 18, of resilient energy absorbing material in this embodiment polyurethane foam, to allow breathing and drainage. The frame and extension walls comprise securing lugs 19 which are engaged by enlarged ends of retaining straps 20 which extend outwardly from the periphery of a perforate rubber sheet 21 (FIG. 3). The seat frame extension 14 and the seat frame itself are provided with seat belt recesses 23 arranged to receive an existing seat belt adjacent a vehicle seat and retain an infant carrier with respect to the vehicle seat.

When it is desired to use the infant carrier for a larger child, say a child beyond the age of six months, the seat frame extension 14 is removed from the end of the long limb 12, the infant carrier is rotated so that the long limb is upright, and screw threaded means 25 interconnect the seat frame extension to the underside of the short limb, so that the seat and seat back portion are elevated by the extension, for use in a seating mode. Again a seat belt recess 23 is available for retaining the seat frame with respect to the vehicle seat by passing the vehicle seat belt over the seat belt recess walls. In this case the short limb becomes the seating portion of the carrier, and the long limb becomes the seat back portion. In order to be of convenient shape in both instances, the edge side walls are so shaped that they provide arm rests in each one of the two positions, and the arm rests are themselves padded.

When used in the seating mode, the lower part of the device is restrained within the vehicle by passing an adult seat belt (not shown) around the base of the device through appropriate seat belt guide recesses 23. The top of the device may also be restrained by passing the upper strap of the adult seat belt through an appropriate guide, or by use of an independent strap attached to the vehicle frame. A suitable harness (not shown) is attached to the seat and the seat back to restrain the child within the device. In the supine mode the device is restrained within the vehicle by passing an adult seat belt around each end of the device through appropriate webbing guide recesses 23, and being joined together with suitable catches, preferably attached to the body of the device.

The invention has a number of advantages over prior art. The example the risk to a young baby is much reduced by use of a perforate sheet. The carrier, being convertible from supine to seating mode, is useful for supporting a child over several years of his life, and in many instances until he is ready to use the vehicle seat belts with some degree of safety, that is, he is of sufficient size to not "submarine" beneath the seat belt on vehicle impact. If desired, use may be made of extending lugs in addition to the seat belt recesses defined above, so that for example the infant carrier can be supported by both lap and sash belts. The walls of the seat frame can conveniently be formed from thermoplastics and/or thermoset material by injection or other moulding.

In another embodiment not illustrated, links join the extension to the seat frame (in the seating mode), providing crank means which upon rotation allows the seat portion to translate relative to the base portion, from an upright seating attitude to a reclined seating attitude.

I claim:

1. An infant carrier comprising walls defining an integral seat and seat back portion, being respectively a short limb and a long limb,
   further walls defining a seat frame extension, and
   securing means between the frame extension and the integral seat and seat back portion, which said securing means comprise first securing means which releasably secure the frame extension to the seat portion to form an open top container for use in a supine mode, and second securing means which releasably secure the frame extension to said short limb to thereby elevate the seat and seat back portion for use in a seating mode, and
   a flexible cover sheet of resilient perforate material, sheet retention means on the container wall structure, and complementary retaining means on the cover sheet releasably engageable with the sheet retention means to thereby retain the sheet to the container walls over the open top of the container when the carrier is used in the supine mode.

2. An infant carrier according to claim 1 wherein said first securing means comprise securing clasps and clasp receivers.

3. An infant carrier according to claim 1 wherein said second securing means comprise screw threaded fasteners.

4. An infant carrier according to claim 1 wherein the walls of both the seat and seat back portion, and the seat frame extension, have surfaces defining belt guide recesses which locate seat belt webbing of a vehicle seat belt, when that seat belt is used for retaining the infant carrier in a vehicle.

5. An infant carrier according to claim 4 wherein said walls also comprise ribs of resilient energy absorbing material.

6. An infant carrier according to claim 4 wherein the walls of at least the seat and seat back portion contain surfaces defining drainage apertures.

* * * * *